United States Patent
Skobeltsyn et al.

(10) Patent No.: US 9,514,743 B2
(45) Date of Patent: Dec. 6, 2016

(54) QUERY REWRITE CORRECTIONS

(71) Applicant: Google Inc., Mountain View, CA (US)

(72) Inventors: Gleb Skobeltsyn, Kilchberg (CH);
Evgeny A. Cherepanov, Adliswil (CH);
Behshad Behzadi, Zurich (CH)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/812,811

(22) Filed: Jul. 29, 2015

(65) Prior Publication Data

US 2016/0063994 A1    Mar. 3, 2016

Related U.S. Application Data (60) Provisional application No. 62/044,146, filed on Aug. 29, 2014.

(51) Int. Cl.
| | | |
|---|---|---|
| G10L 15/00 | (2013.01) | |
| G10L 15/08 | (2006.01) | |
| G10L 15/22 | (2006.01) | |
| G06F 17/30 | (2006.01) | |
| G06F 17/27 | (2006.01) | |

(52) U.S. Cl.
CPC ............ *G10L 15/08* (2013.01); *G06F 17/271* (2013.01); *G06F 17/2765* (2013.01); *G06F 17/30654* (2013.01); *G06F 17/30663* (2013.01); *G06F 17/30746* (2013.01); *G10L 15/22* (2013.01); *G10L 2015/223* (2013.01)

(58) Field of Classification Search
CPC .. G06F 17/271; G06F 17/2765; G06F 17/289; G06F 17/30654; G06F 17/30663; G10L 15/08; G10L 15/22; G10L 15/18; G10L 15/183; G10L 15/32; G10L 15/26
USPC ...... 704/257, 231, 252, 236, 251, 2, 3, 4, 6, 7,704/8, 260, 267, 275, 277
See application file for complete search history.

(56) References Cited

U.S. PATENT DOCUMENTS

| | | |
|---|---|---|
| 5,794,189 A | 8/1998 | Gould |
| 6,064,959 A | 5/2000 | Young et al. |
| 6,879,956 B1 | 4/2005 | Honda et al. |
| 7,319,957 B2 | 1/2008 | Robinson et al. |
| 7,756,710 B2 | 7/2010 | Franco et al. |
| 8,185,392 B1 * | 5/2012 | Strope ..................... G10L 15/01 704/231 |

(Continued)

FOREIGN PATENT DOCUMENTS

EP    1189203    3/2002

OTHER PUBLICATIONS

International Search Report and Written Opinion for International Application No. PCT/US2015/047032, mailed Nov. 9, 2015, 12 pages.

*Primary Examiner* — Charlotte M Baker
(74) *Attorney, Agent, or Firm* — Fish & Richardson P.C.

(57) ABSTRACT

Methods, systems, and apparatus, including computer programs encoded on computer storage media, for natural language processing. One of the methods includes receiving a first voice query; generating a first recognition output; receiving a second voice query; determining from a recognition of the second voice query that the second voice query triggers a correction request; using the first recognition output and the second recognition to determine a plurality of candidate corrections; scoring each candidate correction; and generating a corrected recognition output for a particular candidate correction having a score that satisfies a threshold value.

15 Claims, 4 Drawing Sheets

(56) References Cited

U.S. PATENT DOCUMENTS

2007/0061317 A1  3/2007  Ramer et al.
2014/0019127 A1  1/2014  Park et al.

* cited by examiner

FIG. 5 great variety of resources, such as image files, audio files, video files, and web pages. A search system can identify resources in response to queries submitted by users and provide information about the resources in a manner that is useful to the users. The users can navigate through, e.g., select, search results to obtain information of interest.

QUERY REWRITE CORRECTIONS

CROSS REFERENCE TO RELATED APPLICATIONS

This application is a non-provisional of and claims priority to U.S. Provisional Patent Application No. 62/044,146, filed on Aug. 29, 2014, the entire contents of which are hereby incorporated by reference.

BACKGROUND

This specification relates to natural language processing.

The Internet provides access to a wide variety of resources, such as image files, audio files, video files, and web pages. A search system can identify resources in response to queries submitted by users and provide information about the resources in a manner that is useful to the users. The users can navigate through, e.g., select, search results to obtain information of interest.

SUMMARY

In general, one innovative aspect of the subject matter described in this specification can be embodied in methods that include the actions of receiving a first voice query; generating a first recognition output; receiving a second voice query; determining from a recognition of the second voice query that the second voice query triggers a correction request; using the first recognition output and the second recognition to determine a plurality of candidate corrections; scoring each candidate correction; and generating a corrected recognition output for a particular candidate correction having a score that satisfies a threshold value. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. Determining that the recognition of the second voice query triggers the correction request includes parsing the second voice query to detect a correction prefix. Using the first recognition output and the second recognition to determine a plurality of candidate corrected queries includes: determining a misrecognition portion of the first recognition output; and substituting the misrecognition portion with one or more candidate n-grams to form a candidate correction. The one or more candidate n-grams are obtained from one or more of: recognition of a correction portion of the second voice query; generated hypotheses of the correction portion of the second voice query; a misrecognition index of phonetically similar n-grams; or n-grams associated with a type or category associated with the correction portion of the second voice query. Each candidate corrected query is scored based at least in part on a phonetic distance between the candidate correction and the first voice input. Each candidate corrected query is scored based at least in part on a query popularity of the candidate correction. The query popularity is based on query counts in a query log that match the candidate correction. The query popularity is based at least on a change in query popularity between the first voice query and the candidate correction.

The subject matter described in this specification can be implemented in particular embodiments so as to realize one or more of the following advantages. Misrecognized voice queries can be corrected with a subsequent query without the user starting the query process over with a new query. Correcting voice queries with a corrected query improves voice search versatility. The corrected voice queries can be provided in a natural way that more closely mirrors human conversational behavior, improving user interactions with a search system.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
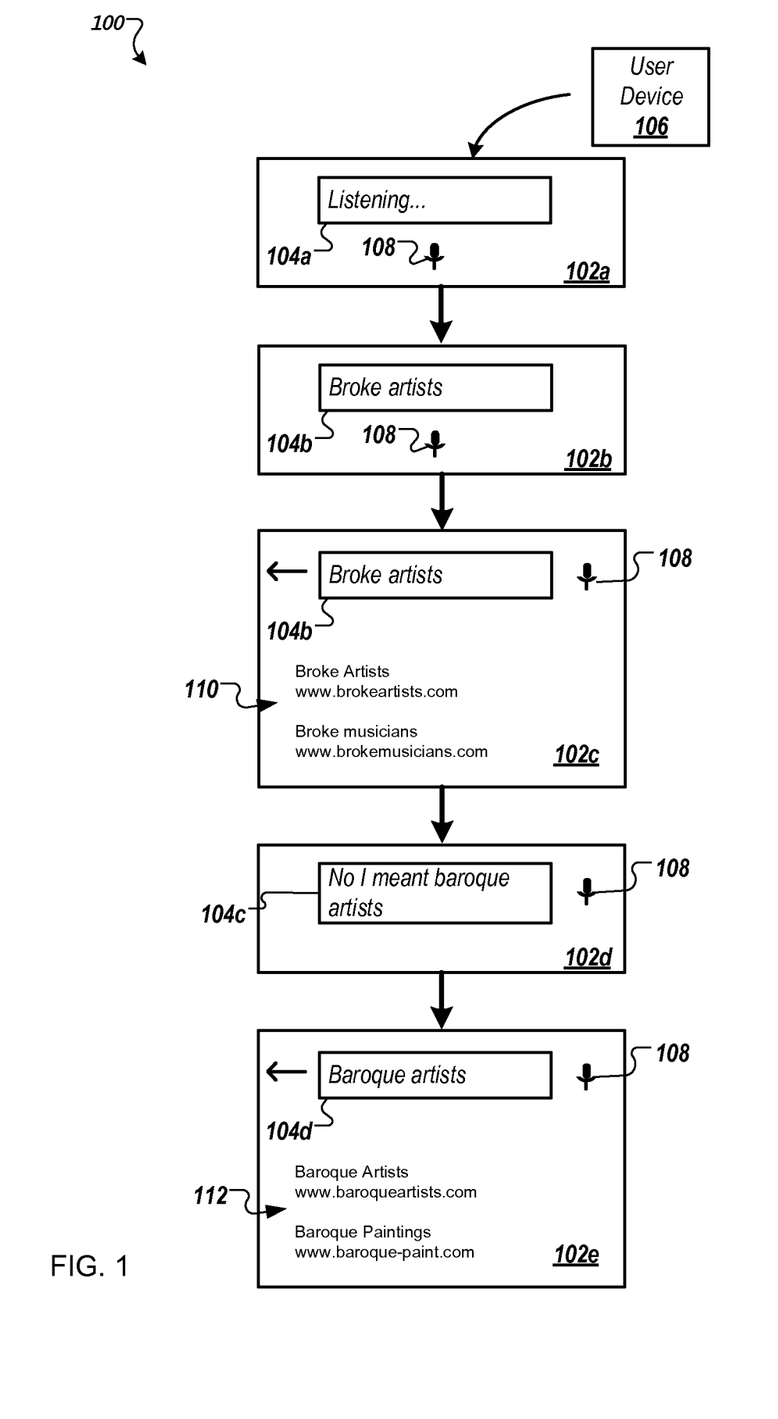
FIG. 1 is an illustration of a voice search including a correction request in an example search user interface.

FIG. 1 is an illustration 100 of a voice search including a correction request in an example search user interface. A search system provides a search user interface 102a for displaying on a user device 106. The user interface 102a includes a search box 104a for receiving a query and a microphone icon 108 for receiving a first voice query from a user. The user inputs a first voice query, e.g., by selecting the microphone icon 108 in the user interface 102a.

In a user session, the search system receives the first voice query from a user. In particular, the user provides a voice input of "Baroque artists." In response to the first voice query, the user interface 102b is presented including a display of a first recognition output generated from the first voice query in a search box 104b. The first recognition output is [broke artists]. For example, a speech-to-text process can be performed on the first voice query to generate a purported transcription as the corresponding recognition output. The search system can provide the transcription to the user device 106 for display in the user interface 102b.

Furthermore, the recognition output can be used by a search system. The search system provides search results 110 responsive to the query [broke artists] for display in user interface 102c. For example, the search results 110 can include links to particular resources determined by the search system to be responsive to the recognized query. However, the recognized query was misrecognized. The user therefore inputs a second voice query, e.g., by selecting the microphone icon 108 in the user interface 102c, e.g., "no I meant baroque artists."

In response to the second voice query, a user interface 102d is presented including a display of a second recognition output from the second voice input in a search box 104c. The second recognized query is [No I meant baroque artists]. The search system determines that the second voice query is a correction of the first voice query, for example, based on recognizing "no I meant" as a correction prefix.

The search system determines a corrected recognition output, [baroque artists], which is presented in a search box 104d of a user interface 102e. Furthermore, in response to the corrected recognition output, the search system provides search results 112 responsive to corrected query [baroque artists] for presentation in the user interface 102e. For example, the search results 112 can include links to particular resources determined by the search system to be responsive to the corrected query.

Figure 2:
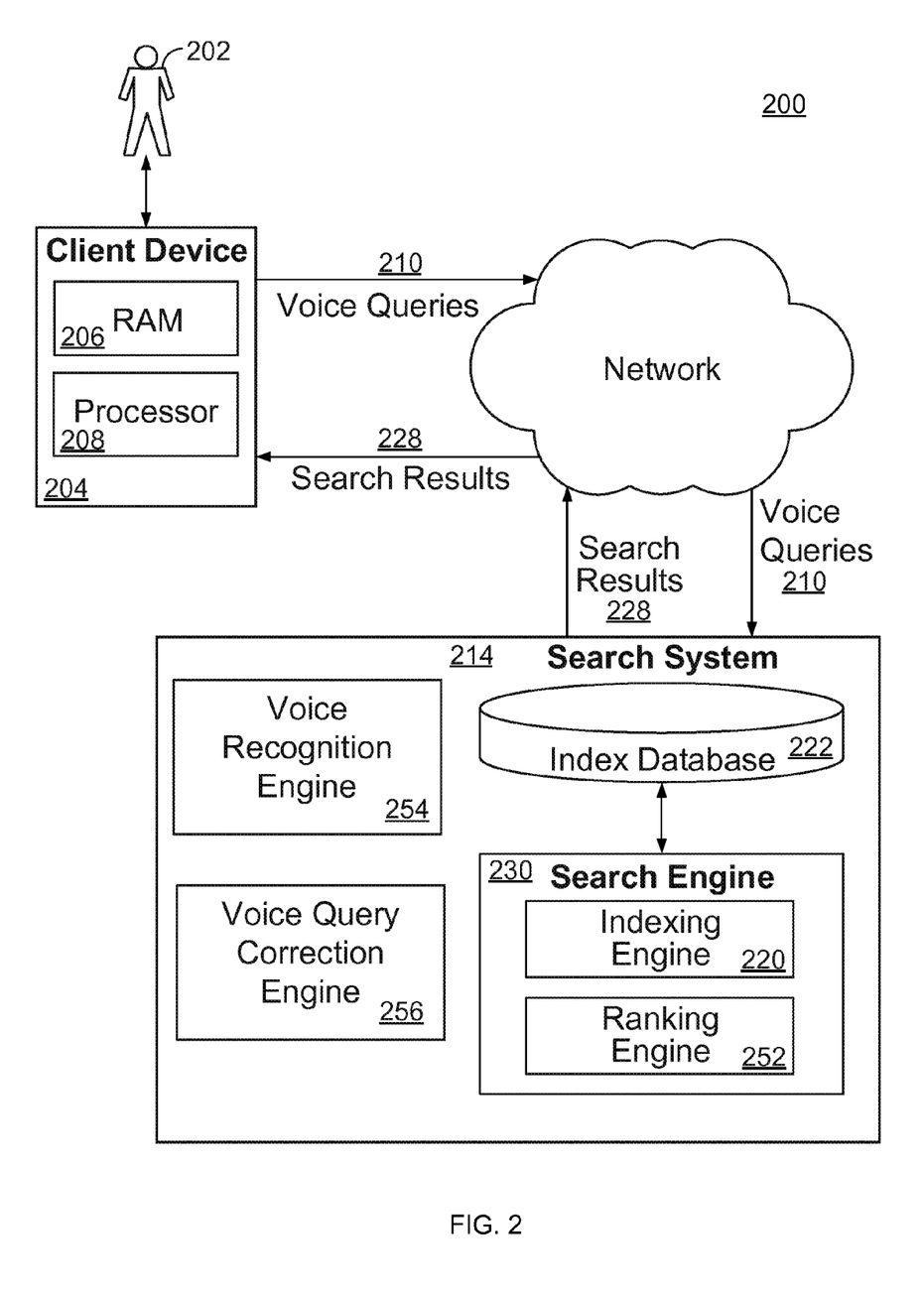
FIG. 2 is a block diagram of a system for providing corrections to voice queries.

FIG. 2 is a block diagram of a system 200 for providing corrections to voice queries. The system 200 provides search results relevant to submitted queries as can be implemented in an internet, an intranet, or another client and server environment. The system 200 is an example of an information retrieval system in which the systems, components, and techniques described below can be implemented.

A user 202 can interact with a search system 214 through a client device 204. For example, the client 204 can be a computer coupled to the search system 214 through a local area network (LAN) or wide area network (WAN), e.g., the Internet. In some implementations, the search system 214 and the client device 204 can be one machine. For example, a user can install a desktop search application on the client device 204. The client device 204 will generally include a random access memory (RAM) 206 and a processor 208.

The user 202 can submit voice queries 210 to a search engine 230 within a search system 214. When the user 202 submits a voice query 210, the voice query 210 is transmitted through a network to the search system 214. The search system 214 can be implemented as, for example, computer programs running on one or more computers in one or more locations that are coupled to each other through a network.

The search system 214 includes a voice recognition engine 254. The voice recognition engine receives the voice query 210 and transcribes the voice query to a recognized query, e.g., using suitable text-to-speech techniques. In some implementations, the recognized query is returned to the client device 204 for presentation to the user 202. Additionally, the recognized query is provided to the search engine 230.

The search system 214 further includes an index database 222 and a search engine 230. The search system 214 responds to an input query by generating search results 228, which are transmitted through the network to the client device 204 in a form that can be presented to the user 202 (e.g., as a search results web page to be displayed in a web browser running on the client device 204).

When the recognized query determined from the voice query 210 is received by the search engine 230, the search engine 230 identifies resources that match, or are responsive to, the query 210. The search engine 230 will generally include an indexing engine 220 that indexes resources (e.g., web pages, images, or news articles on the Internet) found in a corpus (e.g., a collection or repository of content), an index database 222 that stores the index information, and a ranking engine 252 (or other software) to rank the resources that match the query 210. The indexing and ranking of the resources can be performed using conventional techniques. The search engine 130 can transmit the search results 228 through the network to the client device 204 for presentation to the user 202.

The search system also includes a correction engine 256. The correction engine 256 corrects the recognized query in response to a correction input from the user 202. In particular, the correction engine 256 can determine that a received voice query 210 includes a correction request, determine candidate corrected queries, score the candidate correction queries, and if a threshold is satisfied, select a particular correction as a corrected recognition output. The selected corrected output is then provided to the search engine 230 as a corrected query and used identify resources that are responsive to the corrected query.

Figure 3:
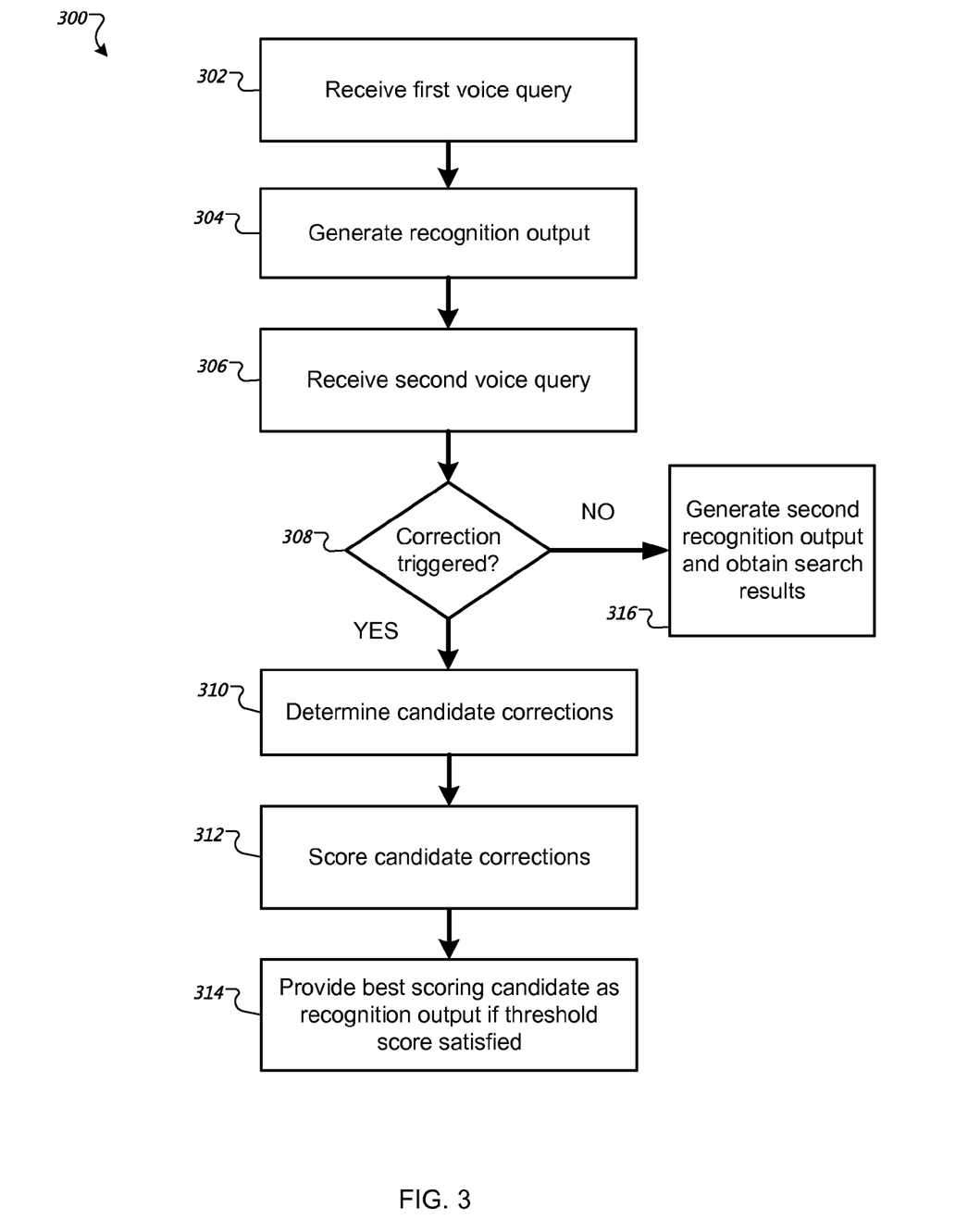
FIG. 3 is a flow diagram of an example process for correcting an input voice query.

FIG. 3 is a flowchart of an example process 300 for correcting an input voice query. For convenience, the process 300 will be described as being performed by a system of one or more computers, located in one or more locations, and programmed appropriately in accordance with this specification. For example, a search system, e.g., the search system 214 of FIG. 2, appropriately programmed, can perform the process 300.

The system receives a first voice query from a user device 302. For example, a search user interface of the user device can include a microphone indicator. When selected by the user, a microphone of the user device captures voice input from the user. The voice input is then transmitted by the user device to the system. The first voice query 302 can be, for example, "who is the president of France?"

The system generates a recognition output 304. The recognition output is a transcription of the received first voice query. For example, a suitable speech to text technique can be used to provide voice recognition of the first voice query and convert it into a recognized text output. In some implementations, the speech to text technique can correct or compensate for errors in the first voice query, e.g., based on spelling and/or grammar rules. The recognition output is provided to the user device, for example, for display in the search interface. The recognition output can be displayed, for example, to indicate the system's recognition of the first voice query. The user can then examine the presented recognition output to determine whether the system correctly recognized the first voice query. For example, the first voice query "who is the president of France" may be recognized as [who is the president of friends]. Here the word "France" was misrecognized as "friends."

Additionally, the system can perform a search using the recognition output as a search query. Search results responsive to the search query can be provided to the user for display in the search interface.

The system receives a second voice query from the user device 306. The second voice query is received in a similar manner from the user device as the first voice query. In particular, the second voice query can be a correction query. For example, the second voice query in response to the recognition output "who is the president of friends" may be "no I meant France."

The system determines whether a correction request is triggered by the second voice query 308. The system determines whether a correction request is triggered by parsing the query according to different correction request grammars. For example, the recognition of the second voice query can be parsed to determine whether the query starts from a "correction prefix" e.g., "no I mean . . . " indicating that the query is a correction of a prior query rather than a new query. In some implementations, the system uses voice recognition hypotheses and fuzzy matching in phonetic space to detect correction prefixes indicating a correction request.

Example grammars that indicate a correction request include:

1. Repeating a part of the query containing the misrecognized word(s):
   Query 1: [who is president of friends]
   Query 2: [president of France]
2. Using a correction command followed by a part of the query containing the misrecognized word(s):
   Query 1: [who is president of friends]
   Query 2: [No, France] or
   Query 2: [I said president of France] or
   Query 2: [No I mean France]
3. Using a correction replace command with both the misrecognized and correct word(s):
   Query 1: [who is president of friends]
   Query 2: [No, not friends, France] or
   Query 2: [I said France not friends]
4. Using a correction command followed by a clarification or disambiguation phrase for the misrecognized word(s):
   By type or category:
      Query 2: [I meant country France] or
      Query 2: [No I mean lynx the animal]
   By a phrase that contains the misrecognized word(s) and a disambiguation phrase:
      Query 2: [I meant be like in "honey bee"]
      Query 2: [No I mean lynx as in "chain links"]
5. Using a semantic correction, for example, a correction command followed by a type, category, or source for the misrecognized word(s):
   Query 1: [who is president of friends]
   Query 2: [I meant the country]
   Query 1: [best fries in Russells]
   Query 2: [No I mean the city in Europe]
6. Using [no it is spelled] command followed by the spelling of the misrecognized word:
   Query 1: [Barack Obama]
   Query 2: [No it's spelled O-B-A-M-A] or
   Query 2: [It's spelled Oslo Boston Atlanta Miami Atlanta]
7. Using a correction command followed by a "spelling clarification" for the misrecognized word:
   Query 2: [I meant lynx with x] or
   Query 2: [No I mean Berklee with double-E]
8. Using a correction command followed by a part of the query containing the misrecognized word(s) which is/are misrecognized again:
   Query 1: [who is president of friends]
   Query 2: [No Franz]

In response to the system determining that a correction request is not triggered, the system sends the recognition output to the client device and provides one or more search results responsive to a query corresponding to the recognition output (316).

In response to the system determining that a correction request is triggered, the system determines candidate corrections to the recognition output of the first voice query (310). To form each candidate correction, an n-gram is substituted into the misrecognition of the recognition output. For example, the misrecognition [who is president of friends] can include as a candidate correction the substitution of "France" for "friends" to generate candidate correction [who is president of France]. One or more different techniques can be used to generate the candidate corrections, as described with respect to FIG. 4.

Figure 4:
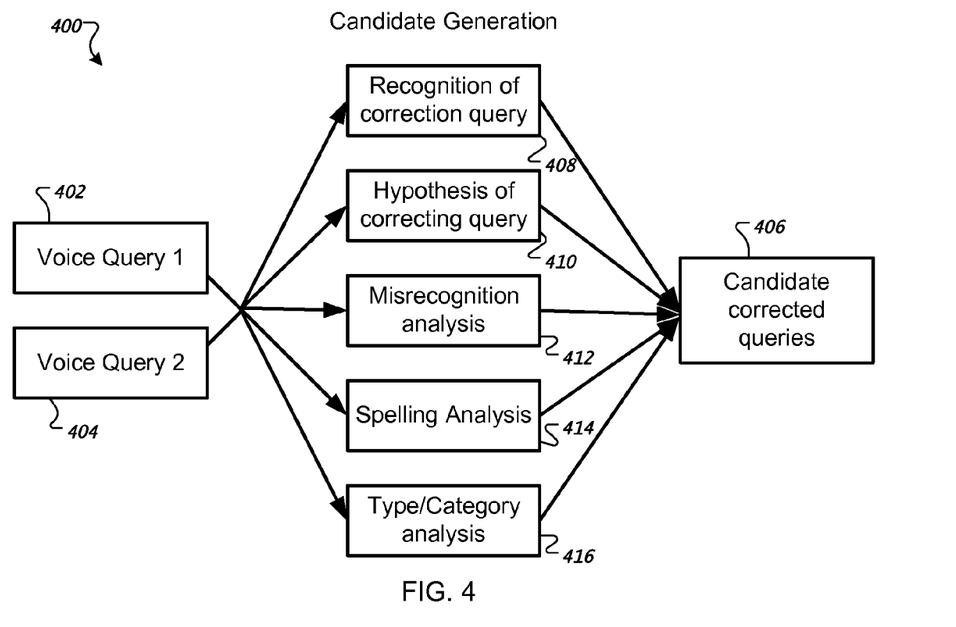
FIG. 4 is a block diagram illustrating example techniques for generating candidate correction.

FIG. 4 is a block diagram 400 illustrating example techniques for generating candidate corrected queries. The candidate generation techniques use one or more of the recognition of the first voice query 402 and the recognition of the second voice query 404 as input and generates candidate corrections 406 as outputs.

Candidate corrections can be generated using a recognition from the correction request 408, i.e., the second voice query 404. In particular, a candidate correction can be obtained by substituting the misrecognition with the correction from the second voice input. For example, if the recognition output of the first voice query is "who is president of friends" and the second voice input is recognized as [no I meant France] the portion following the correction prefix [no I meant] is used as the candidate substitution n-gram into the first recognition output. In this example, the candidate substitution n-gram "France" can be substituted into the original recognition. This results in candidate corrections [who is president of France], [who is president France], [who is the France], and [who is France].

Candidate corrections can be generated using various hypotheses of the correction request 410. The correction request may also be misrecognized. For example, [who is president of friends] can be followed by the correction request recognized as [no, I said Franz,] where "France" was still misrecognized, this time as "Franz." Additional recognition hypotheses for the second voice input can then be used to generate additional candidate corrections.

In the above example, additional hypotheses for recognizing the second voice input of "no I said France" can include [no I said Franz], [no I said France], [no I sat France], [noah sad friends] and so on. These hypotheses, generated e.g., from speech-to-text recognition, are used, as described with the recognition from the correction request 408, to generate candidate corrections by substituting n-grams of the various hypotheses into the misrecognized output for the first voice query including, for example, [who is the president of Franz], [who is the president of France], etc.

Candidate corrections can be generated using an obtained misrecognition index 412. The misrecognition index can be obtained by the system for use in identifying candidate corrections. The misrecognition index provides a lookup of possible phonetically similar values to a part in question with a give context or type. In some implementations, the misrecognition index is generated from typed queries and n-grams and maintains pre-computed top-N lists for keys derived from phonetic representation. The top-N lists are re-ranked based on phonetic similarity of actual phonetic representations. The phonetically similar values can be substituted into the misrecognition to generate candidate corrections. The n-grams can be ranked, for example, based on how often a particular first n-gram is misrecognized as a particular replacement second n-gram in voice query logs and how popular the query having the first n-gram replaced by the second n-gram is.

For example, the misrecognition "friends" with the left context "president of" can be identified in the index as being phonetically similar to, for example, "France," "Iran", and "finance." The misrecognition index can also provide a lookup of phonetically similar values to a part in question based on a particular type. For example, the misrecognition "mouse" can be phonetically similar to terms of the type "bug" including "moth," "mantis," "mantid," etc. The misrecognition index can be generated using obtained semantic relationships between entities, e.g., to determine that "France" and "Iran" have a same entity type of "Country."

Candidate corrections can be generated using spelling analysis 414. In particular, the second voice query can recite the spelling of the misrecognition. For example, the correction request can be recognized as [No it's spelled B-E-L-T-R-A-N]. The system can assemble the spelling in to a single word and use it as a substitution into the misrecognition.

Candidate corrections can be generated using type or category analysis 416. For example, the first voice query can be "who is the president of France" recognized as [who is the president of friends]. The correction request can be recognized as [no I meant the country]. In this case, instead of repeating the correct term, France, the user indicated a category to which the correct term belongs. Using the correction request as the substitution (408), one candidate correction would be [who is the president of country]. However, the system can also recognize that the type/category that the user wants to correct is "country." For example, and index or other collection of terms known to represent types or categories can be used to identify instances where the correction input is a reference to a type or category of information. The type/category index can be used to identify entities with type "country" that are phonetically similar to "friends." These similar entities of type "country" can then be substituted to generate additional candidate corrections.

Referring back to FIG. 3, the candidate corrections are scored (312). Each candidate correction is assigned a score value based on one or more applied scoring techniques. Each candidate correction includes information on the replacement source and target as well as an interpretation of the correction request based, e.g., on the grammar used. One or more different techniques can be used to score candidate corrections, as described with respect to FIG. 5.

Figure 5:
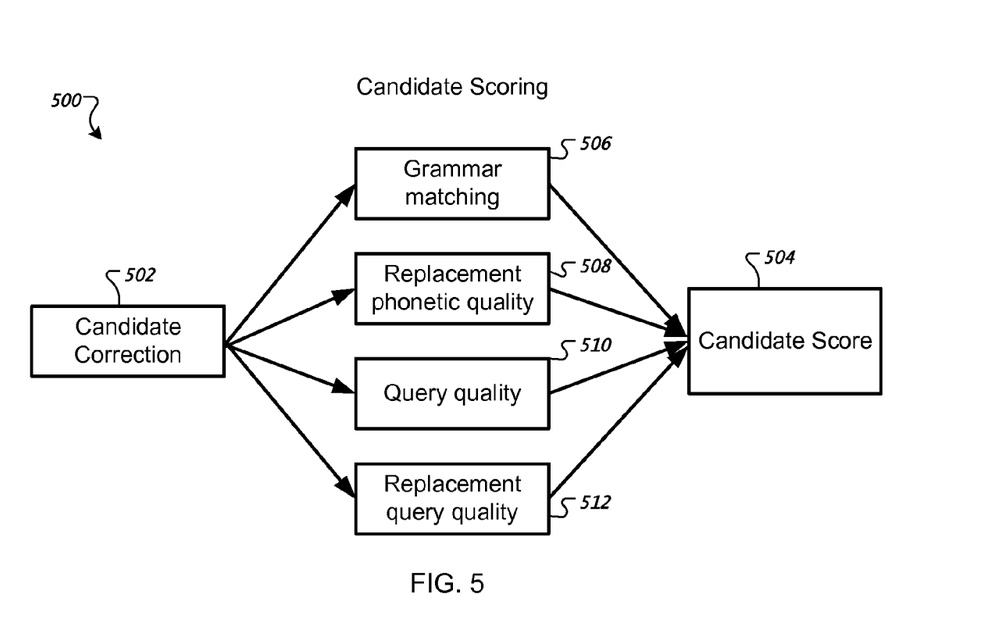
FIG. 5 is a block diagram illustrating example factors in generating a score for a candidate correction.

FIG. 5 is a block diagram 500 of example factors in generating a score for a candidate corrected query. The score 504 for a candidate corrected query 502 can be generated using one or more scoring factors. For example, multiple scoring factors can be used in a scoring formula. The scoring formula can optionally be weighted, giving more scoring weight to particular scoring factors.

A candidate correction can be scored based on a confidence in the grammar matching 506. This can include a determination of a probability that the second voice query represents a correction request based on the parsed specific grammar. The confidence in the grammar matching can also include grammar specific scoring, for example, how well a particular "type" matches a term in the correction request. In some implementations, a higher weight is given to grammars that are more general as compared to specific grammars. In some implementations, the grammar based weighting is used to tune how aggressively the system directly substitutes the correction vs. using the grammar type, e.g., using "country" as a type rather than substituting "country" for the misrecognized query following the correction [no I meant the country].

The candidate correction can be scored based on a measure of replacement phonetic quality 508. The replacement phonetic quality can be based on the phonetic similarity between n-grams representing the candidate correction n-gram and the n-gram in the misrecognition being substituted for. In particular, this is a measure of the probability that a user provided a voice input that was recognized as the misrecognition. A phonetic distance can be calculated between the two n-grams to provide a measure of the phonetic similarity. Various suitable measures for similarity can be used including, for example, a phonetic similarity function using phonetic edit distance.

The candidate correction can be scored based on a measure of query quality 510. The measure of query quality represents a probability that the user wanted to issue the candidate correction as a query. The probability can be based on one or more of a query popularity, a pattern of the query, or whether the query triggers an answer box or other direct search response. The query popularity can be measured based at least in part on counts of how many times a matching or similar query has been issued, e.g., using logs. The pattern of the query can be used to determine a semantic quality of the query. In some other implementations, the query quality can also include length of the candidate correction as a factor. In particular, longer candidate corrections having a threshold popularity value can be scored higher than shorter candidate corrections having a similar popularity.

The candidate correction can be scored based on a measure of replacement query quality 512. Replacement query quality represents how the query would improve if the candidate correction replaces the original misrecognized query. Replacement query quality can be based on, for example, popularity of the original query vs. the rewritten query. The popularity can be estimated statistically for queries that are not found in query logs. The replacement query quality can also be based on search results generated for each respective query. A quality measure for results can be compared between the queries.

The scoring factors can be combined to generate the overall candidate score 504 for each candidate correction 502.

Referring back to FIG. 3, the system provides a highest scoring candidate correction as a corrected recognition output if a threshold score value is satisfied 314. In particular, a threshold score value can be established such that an uncorrected recognition output is provided in response to score values that do not satisfy the threshold. For example, the scores can be such that there is not a high degree of confidence in any of the candidate corrections.

The highest scoring candidate correction becomes the corrected recognition output and can be provided for display on the client device. Additionally, the corrected recognition output can be used as a search query. One or more search results responsive to the search query can be provided to the user device for display, e.g., in a search interface. Additionally, in some implementations, the search query triggers a particular answer box. The answer box provides a specific entity or other information in response to the query. For example, for the corrected recognition output of [who is the president of France], the system can provide an answer box that indicates the president of France is François Hollande. The answer box can be supplemented by one or more search results.

Similarly, in this specification the term "engine" will be used broadly to refer to a software based system or subsystem that can perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

Control of the various systems described in this specification, or portions of them, can be implemented in a computer program product that includes instructions that are stored on one or more non-transitory machine-readable storage media, and that are executable on one or more processing devices. The systems described in this specification, or portions of them, can each be implemented as an apparatus, method, or electronic system that may include one or more processing devices and memory to store executable instructions to perform the operations described in this specification.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
    receiving a first voice query;
    generating a first recognition output;
    receiving a second voice query;
    determining from a recognition of the second voice query that the second voice query triggers a correction request, wherein determining that the recognition of the second voice query triggers the correction request includes parsing the second voice query to detect a correction prefix;
    using the first recognition output and the second recognition to determine a plurality of candidate corrections;
    scoring each candidate correction; and
    generating a corrected recognition output for a particular candidate correction having a score that satisfies a threshold value.

2. The method of claim 1, wherein using the first recognition output and the second recognition to determine a plurality of candidate corrected queries comprises:
    determining a misrecognition portion of the first recognition output; and
    substituting the misrecognition portion with one or more candidate n-grams to form a candidate correction.

3. The method of claim 2, wherein the one or more candidate n-grams are obtained from one or more of:
    recognition of a correction portion of the second voice query;
    generated hypotheses of the correction portion of the second voice query;
    a misrecognition index of phonetically similar n-grams; or
    n-grams associated with a type or category associated with the correction portion of the second voice query.

4. The method of claim 1, wherein each candidate corrected query is scored based at least in part on a phonetic distance between the candidate correction and the first voice input.

5. The method of claim 1, wherein each candidate corrected query is scored based at least in part on a query popularity of the candidate correction.

6. The method of claim 5, wherein the query popularity is based on query counts in a query log that match the candidate correction.

7. The method of claim 5, wherein the query popularity is based at least on a change in query popularity between the first voice query and the candidate correction.

8. One or more non-transitory computer-readable storage media encoded with instructions that, when executed by one or more computers, cause the one or more computers to perform operations comprising:
    receiving a first voice query;
    generating a first recognition output;
    receiving a second voice query;
    determining from a recognition of the second voice query that the second voice query triggers a correction request, wherein determining that the recognition of the second voice query triggers the correction request includes parsing the second voice query to detect a correction prefix;
    using the first recognition output and the second recognition to determine a plurality of candidate corrections;
    scoring each candidate correction; and
    generating a corrected recognition output for a particular candidate correction having a score that satisfies a threshold value.

9. A system comprising:
    a user device; and
    one or more computers configured to interact with the user device and to perform operations comprising:
        receiving a first voice query from the user device;
        generating a first recognition output;
        receiving a second voice query from the user device;
        determining from a recognition of the second voice query that the second voice query triggers a correction request, wherein determining that the recognition of the second voice query triggers the correction request includes parsing the second voice query to detect a correction prefix;
        using the first recognition output and the second recognition to determine a plurality of candidate corrections;
        scoring each candidate correction; and
        generating a corrected recognition output for a particular candidate correction having a score that satisfies a threshold value.

10. The system of claim 9, wherein using the first recognition output and the second recognition to determine a plurality of candidate corrected queries comprises:
    determining a misrecognition portion of the first recognition output; and substituting the misrecognition portion with one or more candidate n-grams to form a candidate correction.

11. The system of claim 10, wherein the one or more candidate n-grams are obtained from one or more of:
   recognition of a correction portion of the second voice query;
   generated hypotheses of the correction portion of the second voice query;
   a misrecognition index of phonetically similar n-grams; or
   n-grams associated with a type or category associated with the correction portion of the second voice query.

12. The system of claim 9, wherein each candidate corrected query is scored based at least in part on a phonetic distance between the candidate correction and the first voice input.

13. The system of claim 9, wherein each candidate corrected query is scored based at least in part on a query popularity of the candidate correction.

14. The system of claim 13, wherein the query popularity is based on query counts in a query log that match the candidate correction.

15. The system of claim 13, wherein the query popularity is based at least on a change in query popularity between the first voice query and the candidate correction.

* * * * *